United States Patent
Su et al.

(10) Patent No.: US 8,961,041 B2
(45) Date of Patent: Feb. 24, 2015

(54) CONNECTOR ASSEMBLY HAVING FLOATABLE OPTICAL MODULE

(75) Inventors: Ping-Sheng Su, New Taipei (TW); Jun Chen, Kunshan (CN); Qing Wang, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 268 days.

(21) Appl. No.: 13/369,297

(22) Filed: Feb. 9, 2012

(65) Prior Publication Data

US 2012/0213482 A1 Aug. 23, 2012

(30) Foreign Application Priority Data

Feb. 18, 2011 (CN) .............................. 20111004339.4

(51) Int. Cl.
*G02B 6/36* (2006.01)
*G02B 6/32* (2006.01)
*G02B 6/38* (2006.01)

(52) U.S. Cl.
CPC .............. *G02B 6/32* (2013.01); *G02B 6/3817* (2013.01)
USPC ................... 385/93; 385/53; 385/57; 385/92

(58) Field of Classification Search
CPC .. G02B 6/4292; G02B 6/4246; G02B 6/3893; G02B 6/3897; G02B 6/4204
USPC ......................................... 385/53, 57, 92, 93
See application file for complete search history.

(56) References Cited

U.S. PATENT DOCUMENTS

| | | | |
|---|---|---|---|
| 5,784,511 A * | 7/1998 | Kikuchi et al. ................. | 385/57 |
| 7,233,723 B2 * | 6/2007 | Williams et al. ................ | 385/33 |
| 7,896,559 B2 | 3/2011 | Yi et al. | |
| 2003/0138219 A1 * | 7/2003 | O'Toole et al. ................. | 385/92 |
| 2005/0041936 A1 * | 2/2005 | Billet et al. ..................... | 385/93 |
| 2005/0271331 A1 * | 12/2005 | Machida et al. ................ | 385/90 |
| 2006/0056781 A1 * | 3/2006 | Okada et al. .................... | 385/93 |
| 2006/0140544 A1 * | 6/2006 | Morimoto et al. .............. | 385/59 |
| 2006/0251362 A1 * | 11/2006 | Uekawa .......................... | 385/93 |
| 2008/0008419 A1 * | 1/2008 | Krahenbuhl et al. ........... | 385/33 |

FOREIGN PATENT DOCUMENTS

| | | |
|---|---|---|
| CN | 1461419 A | 12/2003 |
| CN | 101345358 | 1/2009 |
| CN | 101876731 A | 11/2010 |

* cited by examiner

*Primary Examiner* — Charlie Peng
*Assistant Examiner* — Mary El Shammaa
(74) *Attorney, Agent, or Firm* — Wei Te Chung; Ming Chieh Chang

(57) ABSTRACT

A connector assembly (100) includes an insulative housing having a base portion and a tongue portion extending forwardly from the base portion, the tongue portion having a top surface and a bottom surface, with a mounting cavity recessed downwardly from the top surface of the tongue portion; an optical module (5) accommodated in the mounting cavity and capable of moving therein along a front-to-back direction; and at least two magnetic elements (91, 92) disposed along the front-to-back direction and arranged in same polarities facing to each other, one of the magnetic elements (92) mounted to the optical module, and the other of the magnetic elements (91) assembled to the insulative housing.

20 Claims, 6 Drawing Sheets

CONNECTOR ASSEMBLY HAVING FLOATABLE OPTICAL MODULE

BACKGROUND OF THE INVENTION

1. Field of the Invention

The present invention relates to a connector assembly, more particularly to a connector assembly capable of transmitting optical signal.

2. Description of Related Art

Recently, personal computers (PC) are used of a variety of techniques for providing input and output. Universal Serial Bus (USB) is a serial bus standard to the PC architecture with a focus on computer telephony interface, consumer and productivity applications. The design of USB is standardized by the USB Implementers Forum (USB-IF), an industry standard body incorporating leading companies from the computer and electronic industries. USB can connect peripherals such as mouse devices, keyboards, PDAs, gamepads and joysticks, scanners, digital cameras, printers, external storage, networking components, etc. For many devices such as scanners and digital cameras, USB has become the standard connection method.

USB supports three data rates: 1) A Low Speed rate of up to 1.5 Mbit/s (187.5 KB/s) that is mostly used for Human Interface Devices (HID) such as keyboards, mice, and joysticks; 2) A Full Speed rate of up to 12 Mbit/s (1.5 MB/s). Full Speed was the fastest rate before the USB 2.0 specification and many devices fall back to Full Speed. Full Speed devices divide the USB bandwidth between them in a first-come first-served basis and it is not uncommon to run out of bandwidth with several isochronous devices. All USB Hubs support Full Speed; 3) A Hi-Speed rate of up to 480 Mbit/s (60 MB/s). Though Hi-Speed devices are advertised as "up to 480 Mbit/s", not all USB 2.0 devices are Hi-Speed. Hi-Speed devices typically only operate at half of the full theoretical (60 MB/s) data throughput rate. Most Hi-Speed USB devices typically operate at much slower speeds, often about 3 MB/s overall, sometimes up to 10-20 MB/s. A data transmission rate at 20 MB/s is sufficient for some but not all applications. However, under a circumstance transmitting an audio or video file, which is always up to hundreds MB, even to 1 or 2 GB, currently transmission rate of USB is not sufficient. As a consequence, faster serial-bus interfaces are being introduced to address different requirements. PCI Express, at 2.5 GB/s, and SATA, at 1.5 GB/s and 3.0 GB/s, are two examples of High-Speed serial bus interfaces.

From an electrical standpoint, the higher data transfer rates of the non-USB protocols discussed above are highly desirable for certain applications. However, these non-USB protocols are not used as broadly as USB protocols. Many portable devices are equipped with USB connectors other than these non-USB connectors. One important reason is that these non-USB connectors contain a greater number of signal pins than an existing USB connector and are physically larger as well. For example, while the PCI Express is useful for its higher possible data rates, a 26-pin connectors and wider card-like form factor limit the use of Express Cards. For another example, SATA uses two connectors, one 7-pin connector for signals and another 15-pin connector for power. In essence, SATA is more useful for internal storage expansion than for external peripherals.

The existing USB connectors have a small size but low transmission rate, while other non-USB connectors (PCI Express, SATA, et al) have a high transmission rate but large size. Neither of them is desirable to implement modern high-speed, miniaturized electronic devices and peripherals. To provide a kind of connector with a small size and a high transmission rate for portability and high data transmitting efficiency is much more desirable.

In recent years, more and more electronic devices are adopted for optical data transmission. It may be a good idea to design a connector which is capable of transmitting an electrical signal and an optical signal. Design concepts are already common for such a type of connector which is compatible of electrical and optical signal transmission. The connector includes metallic contacts assembled to an insulated housing and several optical lenses bundled together and mounted to the housing also. A kind of hybrid cable includes wires and optical fibers that are respectively attached to the metallic contacts and the optical lenses.

For example, CN Pub. Pat. No. 101345358 published on Jan. 14, 2009 discloses an optical USB connector which has a fiber device added to a USB connector. The fiber device includes a number of optical lenses and several fibers respectively connected to the lenses. Thus, the optical USB connector can transmit electrical signals and optical signals. However, optical lenses are unable to being floatable with regard to the housing, and they are not accurately and aligned with and optically coupled to counterparts, if there are some errors in manufacturing process.

U.S. Pat. No. 7,896,559 issued on Mar. 1, 2011 to Yi et al. discloses a cable assembly having floatable termination. The cable assembly includes an insulative housing with a base portion and tongue portion projecting forwardly from the base portion, a mounting cavity defined in the tongue portion; a plurality of contacts supported by the base portion, each contact having a mating portion arranged proximate to the top side of the tongue portion, and a tail portion extending beyond a back surface of the base portion; an optical module accommodated in the mounting cavity and a spring member arranged between the optical module and a back side of the mounting cavity to urge the optical module forwardly.

Yi's device has proposed a solution to solve the aforementioned problem by adding one spring member located behind and constantly urging the optical module which is capable of moving with regarding to the insulative housing. However, the optical module may tilt when move on the insulative housing. It is desirable to provide an improved cable assembly with an optical module capable of moving on a corresponding insulative housing more stable or balanceable so as to ensure proper mating with its counterpart.

BRIEF SUMMARY OF THE INVENTION

Accordingly, an object of the present invention is to provide a connector assembly that has a floatable optical module.

In order to achieve the above-mentioned object, a connector assembly in accordance with the present invention comprises an insulative housing having a base portion and a tongue portion extending forwardly from the base portion, the tongue portion having a top surface and a bottom surface, with a mounting cavity recessed downwardly from the top surface of the tongue portion; an optical module accommodated in the mounting cavity and capable of moving therein along a front-to-back direction; and at least two magnetic elements disposed along the front-to-back direction and arranged in same polarities facing to each other, one of the magnetic elements mounted to the optical module, and the other of the magnetic elements assembled to the insulative housing.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
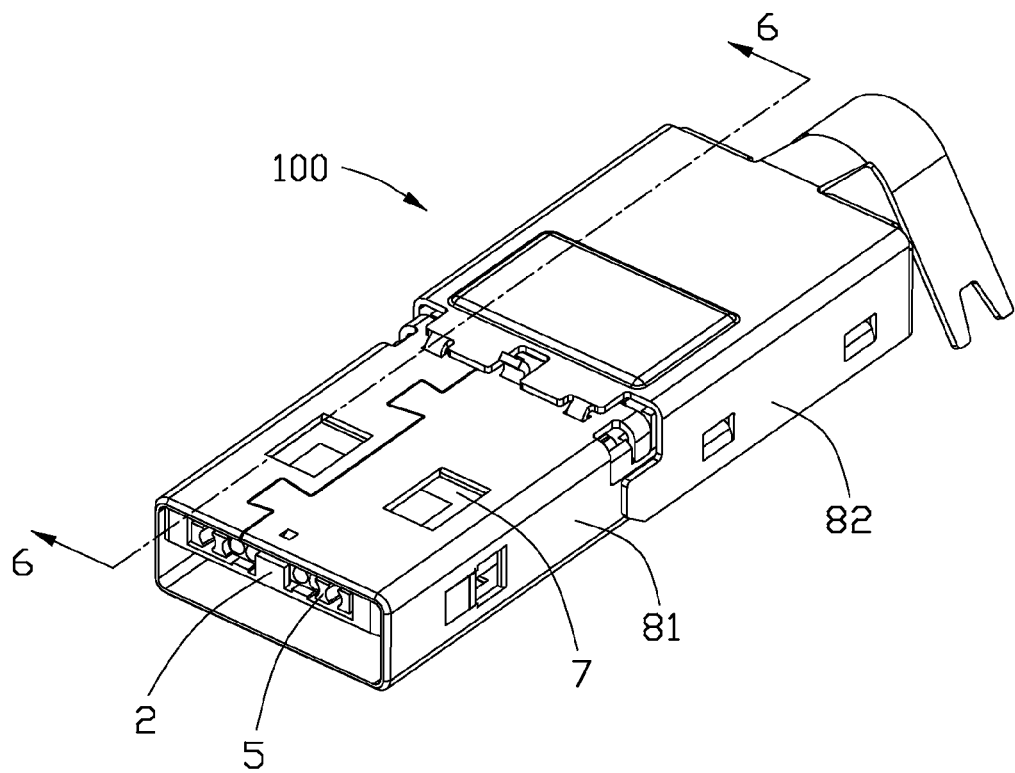
FIG. 1 is an assembled, perspective view of a connector assembly in accordance with the present invention.

In the following description, numerous specific details are set forth to provide a thorough understanding of the present invention. However, it will be obvious to those skilled in the art that the present invention may be practiced without such specific details.

Reference will be made to the drawing figures to describe the present invention in detail, wherein depicted elements are not necessarily shown to scale and wherein like or similar elements are designated by same or similar reference numeral through the several views and same or similar terminology.

Figure 2:
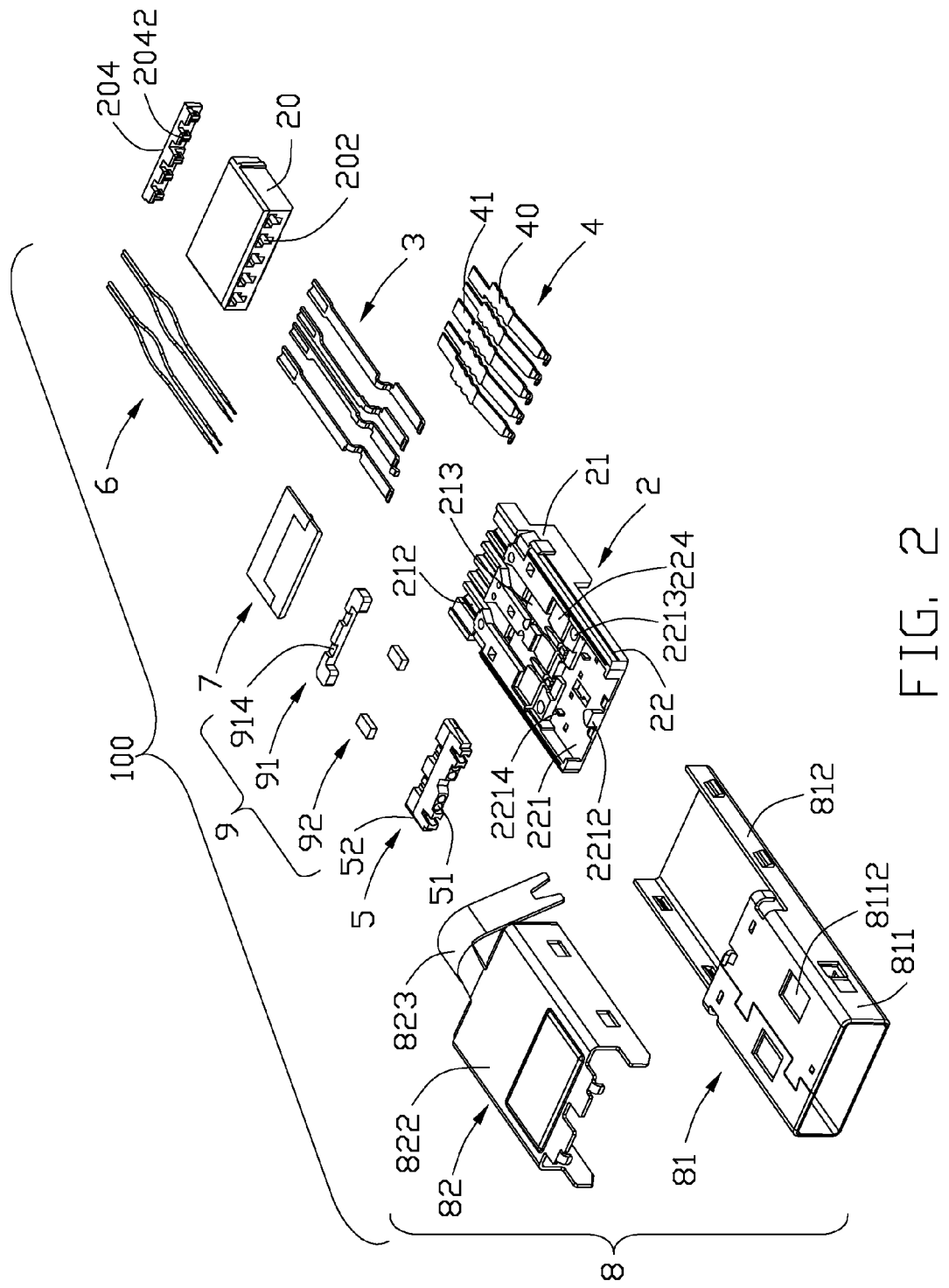
FIG. 2 is an exploded, perspective view of FIG. 1.
Figure 3:
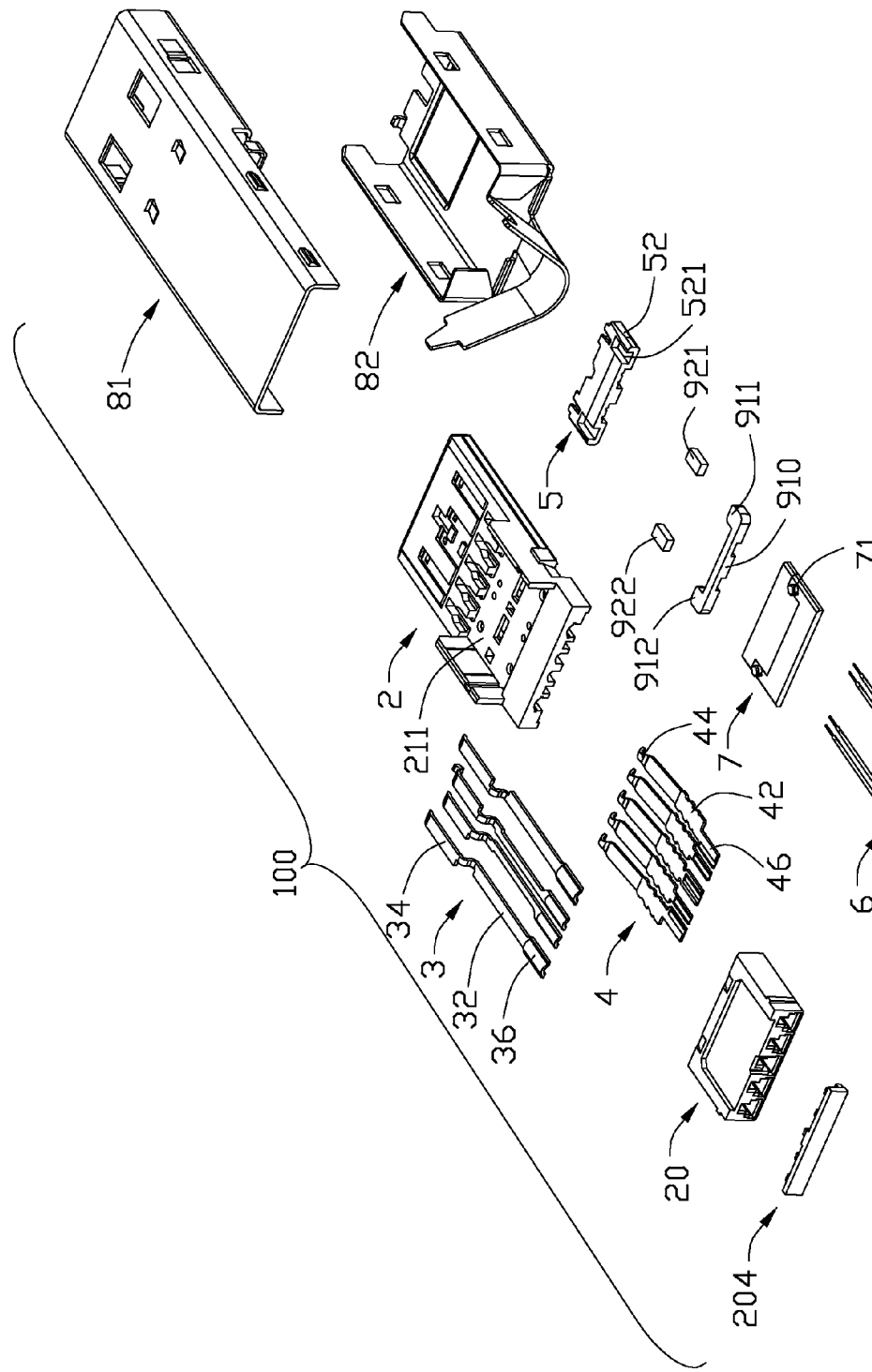
FIG. 3 is similar to FIG. 2, but viewed from another aspect.
Figure 4:
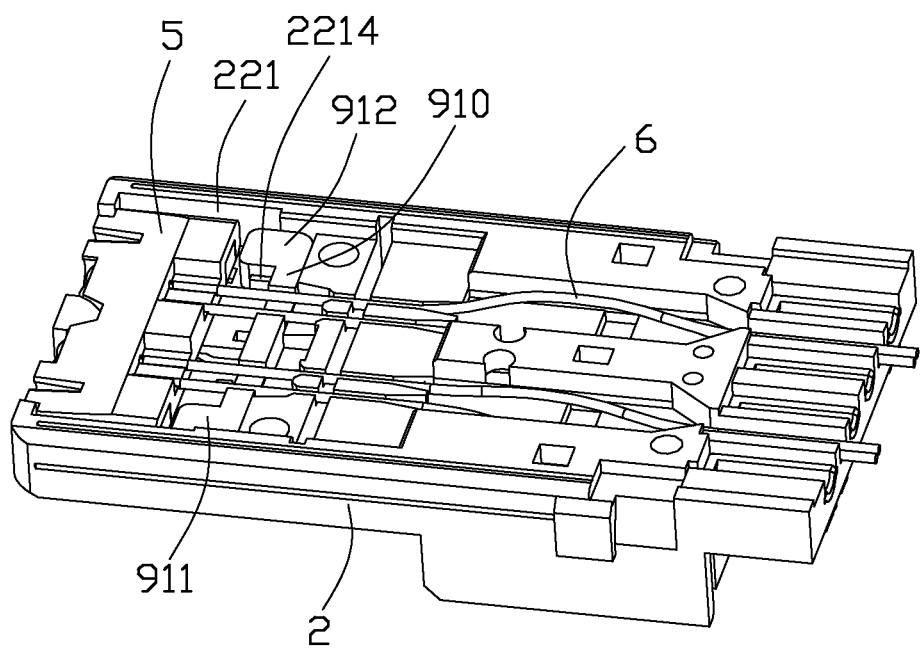
FIG. 4 is a partially assembled view of the connector assembly.
Figure 5:
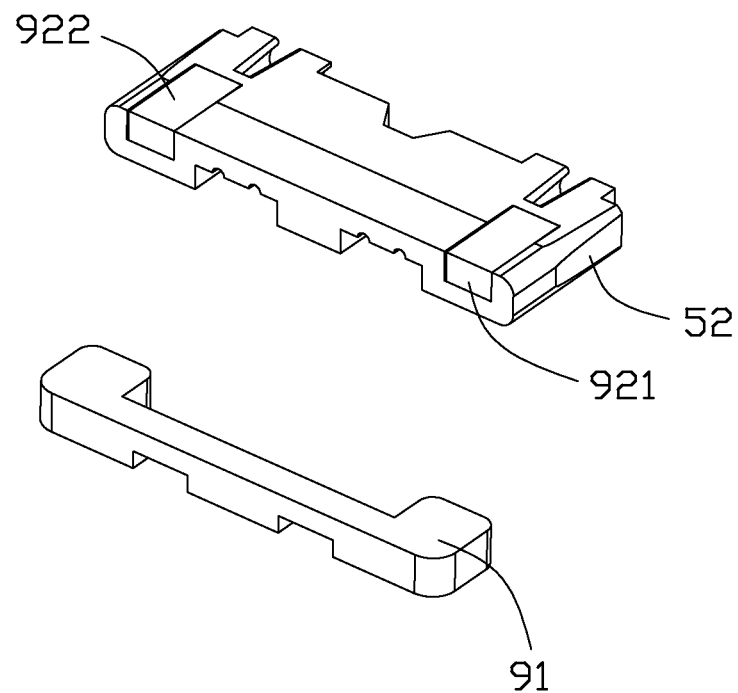
FIG. 5 shows magnetic elements and an optical module of the connector assembly.
Figure 6:
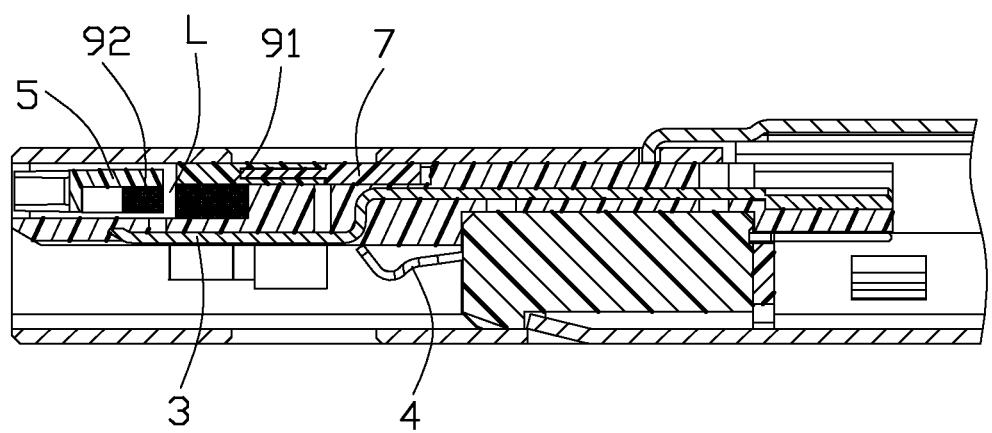
FIG. 6 is a cross-section view of FIG. 1 taken along line 6-6.

Referring to FIGS. 1-6, a connector assembly 100 according to the present invention is disclosed. The connector assembly 100 comprises an elongated insulative housing 2 extending along a front-to-back direction, a set of first contacts 3, a set of second contacts 4 and an optical module 5 supported by the insulative housing 2, and a number of fibers 6 coupled to the optical module 5. The connector assembly 1 further comprises a cap member 7, a metal shell 8 and magnetic elements 9. The magnetic elements 9 may provide magnetic force to push/urge the optical modular 5 moving along the front-to-back direction. Detail description of these elements and their relationship and other elements formed thereon will be detailed below.

The insulative housing 2 includes a base portion 21 and a tongue portion 22 extending forwardly from the base portion 21. A cavity 211 is recessed upwardly from a bottom surface (not numbered) of the base portion 21. A mounting cavity 221 is recessed downwardly from a top surface of the tongue portion 22. A stopping member 2212 is formed in a front portion of the mounting cavity 221. A depression 224 is defined in a rear portion of the tongue portion 22 and communicating with the mounting cavity 221. The mounting cavity 221 is deeper than the depression 224. A number of contact slots 212 are defined in an upper segment of a rear portion of the base portion 21. Two fiber grooves 213 are defined in the base portion 21 and extend along the front-to-back direction, pass the depression 224 and communicate with the mounting cavity 221. Two positioning members 2214 are located in a back section of the mounting cavity 221 and disposed in front of a back side of the mounting cavity 221. The two positioning members 2214 are spaced apart from each other along a transversal direction which is perpendicular to the front-to-back direction.

The set of first contacts 3 have four contact members arranged in a row along the transversal direction. Each first contact 3 substantially includes a planar retention portion 32 insert molded with the base portion 21, a mating portion 34 raised upwardly and extending forwardly from the retention portion 32 and located on a bottom side of the tongue portion 22, and a tail portion 36 extending rearward from the retention portion 32 and accommodated in the contact slots 212.

The set of second contacts 4 have five contact members arranged in a row along the transversal direction and combined with an insulator 20. The set of second contacts 4 are separated into two pairs of signal contacts 40 for transmitting differential signals and a grounding contact 41 disposed between the two pair of signal contacts 40. Each signal contact 4 includes a planar retention portion 42 received in corresponding groove 202 in the insulator 20, a curved mating portion 44 extending forward from the retention portion 42 and disposed beyond a front surface of the insulator 20, and a tail portion 46 extending rearward from the retention portion 42 and disposed behind a back surface of the insulator 20. A spacer 204 is assembled to the insulator 20, with a number of ribs 2042 thereof inserted into the grooves 202 to position the second contacts 4 in the insulator 20.

The insulator 20 is mounted to the cavity 211 of the base portion 21, with mating portions 44 of the second contacts 4 located behind the mating portions 34 of the first contacts 3 and disposed below the bottom side of the tongue portion 22, the tail portions 46 of the second contacts 4 arranged on a bottom surface of the rear segment of the base portion 21 and disposed lower than the tail portions 36 of the first contacts 3.

The optical module 5 includes four lens members 51 arranged in juxtaposed manner and enclosed by a holder member 52 and retained in the mounting cavity 221. The optical module 5 is capable of moving in the mounting cavity 221 along the front-to-back direction. The lens members 51 are exposed to a front opening of the mounting cavity 221. There are two retaining slots 521 located in back section of the holder member 52. The two retaining slots 521 are spaced apart from each other along the transversal direction.

The magnetic elements 9 includes at least one first magnetic element 91 and two second magnetic elements 92. The first magnetic element 91 and the second magnetic elements 92 are disposed along front-to-back direction and arranged in same polarities facing to each other. Thus, the first magnetic element 91 and the second magnetic elements 92 repel each other along the front-to-back direction.

The first magnetic element 91 is U-shaped one-piece structure and has a transversal body portion 910 and two end portions formed at opposite ends of the body portion 910 and extending along the front-to-back direction. The two end portions include a first forward end 911 designated north pole and a second forward end 912 designated south pole. That is to say the first forward end 911 and the second forward end 912 arranged in opposing polarities. However, it should be noted that the first forward end 911 may be south pole and the second forward end 912 may be north pole. In addition, there are two grooves 914 extending along the front-to-back direction and passing through an upper section of the body portion 910. The first magnetic element 91 is accommodated in a back section of the mounting cavity 221, with the body portion 910 disposed behind the two positioning members 2214 and further abutting against the back side of the mounting cavity 221. Therefore, the body portion 910 is sandwiched between the positioning members 2214 and the back side of the mounting cavity 221. The positioning members 2214 are respectively located at corners of the body portion 910 and the first forward end 911 and the second forward end 912.

The second magnetic elements 92 includes a first bar-shaped magnetic element 921 and a second bar-shaped magnetic element 922. The first bar-shaped magnetic element 921 and the second bar-shaped magnetic element 922 are respectively accommodated in the two retaining slots 521 of the holder member 52. The first bar-shaped magnetic element 921 aligns with the first forward end 911 of the first magnetic element 91 along the front-to-back direction, and the first bar-shaped magnetic element 921 has a first backward end (not numbered) designated north pole and disposed proximate to a back side of the holder member 52. Thus, the first bar-shaped magnetic element 921 and the first forward end 911 of the first magnetic element 91 repel with each other by corresponding magnetic force. The second bar-shaped magnetic element 922 aligns with the second forward end 912 of the first magnetic element 91 along the front-to-back direction, and the second bar-shaped magnetic element 922 has a second backward end (not numbered) designated south pole and disposed proximate to the back side of the holder member 52. Thus, the second bar-shaped magnetic element 922 and the second forward end 912 of the first magnetic element 91 repel with each other by corresponding magnetic force.

The first magnetic element 91 and the second magnetic element 92 have a distance "L", which is enough for the optical module 5 backward movement inside the mounting cavity 221. Thus, the optical module 5 is floatable in the mounting cavity 221. It is easy to assemble the first magnetic element 91 and the second magnetic elements 92 to the insulative housing 2 and the optical module 5. In alternative embodiment, the first magnetic element 91 may insert-molded with the first insulative housing 2, and the second magnetic elements 92 may also insert-molded with the optical module 5. In other alternative embodiment, the first magnetic element 91 are located in front of the second magnetic element 92 and arranged in opposing polarities. Thus, the first magnetic element 91 may be positioned in the insulative housing 2 and attract the second magnetic elements 92 combined with the optical module 5. Understandably, under the attraction arrangement one of the magnetic element 91 and 92 may be replaced with the general magnet-attractive metal piece rather than the magnetic element.

Four fibers 6 are separated into two groups and enter a rear section of the mounting cavity 221, through the fiber grooves 213, the two grooves 914 of the first magnetic element 91 and are coupled to the four lens 51, respectively. The cap member 7 is assembled to the depression 224 to shield the first magnetic 91. Furthermore, the fibers 6 are confined in the fiber grooves 213, and they are unable to drift freely in the mounting cavity 221. There are two crushable ribs 71 formed on a bottom side of the cap member 7 and engaged with corresponding engaging holes 2213 located in the depression 224.

The metal shell 8 comprises a first shield part 81 and a second shield part 82. The first shield part 81 includes a front tube-shaped mating frame 811, a rear U-shaped body section 812 connected to a bottom side and lateral sides of the mating frame 811. The mating frame 811 further has two windows 8112 defined in a top side thereof. The second shield part 82 includes an inverted U-shaped body section 822, and a cable holder member 823 attached to a top side of the body section 822.

The insulative housing 2 is assembled to the first shield part 81, with the tongue portion 22 enclosed in the mating frame 811, the cap member 7 disposed underneath the windows 811, and the base portion 21 is received in the body portion 812. The second shield part 82 is assembled to the first shield part 81, with body portions 822, 812 combined together. The connector assembly may have a hybrid cable (not shown) which includes fibers 6 for transmitting optical signals and copper wires (not shown) for transmitting electrical signals. The copper wires are terminated to the first contacts 3 and the second contacts 4. The cable holder member 823 is crimped onto corresponding cable to enhance mechanical interconnection.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

What is claimed is:

1. A connector assembly, comprising:
    an elongated insulative housing having a base portion and a tongue portion extending forwardly from the base portion, the tongue portion having a top surface and a bottom surface, with a mounting cavity recessed downwardly from the top surface of the tongue portion;
    an optical module accommodated in the mounting cavity and capable of moving therein along a front-to-back direction; and
    at least two magnetic elements disposed along the front-to-back direction and arranged in related polarities facing to each other for resulting in interacting forces therebetween, one of the magnetic elements mounted to the optical module, and the other of the magnetic elements assembled to the insulative housing.

2. The connector assembly as claimed in claim 1, wherein the optical module includes a plurality of lens members arranged in juxtaposed manner and enclosed by a corresponding holder member.

3. The connector assembly as claimed in claim 2, wherein there is a retaining slot located in a back section of the holder member, and one of the two magnetic elements is accommodated in the retaining slot.

4. The connector assembly as claimed in claim 1, wherein the other of the two magnetic elements is accommodated in a back segment of mounting cavity of the insulative housing.

5. The connector assembly as claimed in claim 1, wherein both two magnetic elements share the same polarity at an interface therebetween, and the magnetic element mounted to the optical module is essentially located in front of the magnetic element mounted to the housing.

6. The connector assembly as claimed in claim 1, further comprising a plurality of contacts supported by the insulative housing wherein the contacts have mating portions arranged at an opposite side of the insulative housing with regarding to the optical module; wherein the contacts includes a set of first contacts and a set of second contacts, and the mating portions of the first contacts are disposed in front of the mating portions of the second contacts along the front-to-back direction.

7. The connector assembly as claimed in claim 6, wherein the mating portions of the first contacts are located on a bottom surface of the tongue portion, and the mating portions of the second contacts are disposed below the bottom surface of the tongue portion.

8. The connector assembly as claimed in claim 7, wherein there is an insulator combined with the second contacts, and there is a cavity recessed upwardly from a bottom surface of the base portion to accommodate the insulator therein.

9. A connector assembly, comprising:
an elongated insulative housing extending along a front-to-back direction, with a mounting cavity defined in the insulative housing;
an optical module accommodated in the mounting cavity and capable of moving therein along a front-to-back direction;
a first magnetic element assembled to the insulative housing and located around the optical module, the first magnetic element having two opposing polarities spaced apart from each other along a transversal direction perpendicular to the front-to-back direction;
a second magnetic element combined with the optical module, the second magnetic element having two opposing polarities spaced apart from each other along the transversal direction and respectively aligning with the two polarities of the first magnetic element; and
wherein the first magnetic element and the second magnetic element interact with each other to equip the optical module with tendency to move forwardly relative to the housing.

10. The connector assembly as claimed in claim 9, wherein the first magnetic element has a transversal body portion and two end portions formed at opposite ends of the transversal body portion, and the two end portions includes a first forward end and a second forward end both being opposing polarizes.

11. The connector assembly as claimed in claim 10, wherein there are two corners formed between the transversal body and the first forward end and the second forward end, and there are two positioning members formed in the mounting cavity and disposed at the two corners, respectively.

12. The connector assembly as claimed in claim 10, wherein the first magnetic element is located behind the second magnetic element and cooperates with the second magnetic element to generate a constantly repelling force therebetween for constantly urging the optical module forwardly.

13. The connector assembly as claimed in claim 12, wherein there are two retaining slots located in a back section of the holder member, and the second magnetic elements includes a first bar-shaped magnetic element and a second bar-shaped magnetic element respectively accommodated in the two retaining slots.

14. The connector assembly as claimed in claim 10, wherein there is at least one groove extending along the front-to-back direction and passing through the body portion of the first magnetic element, and there is at least one fiber passing through the groove in the first magnetic element and connected to the corresponding lens member.

15. The connector assembly as claimed in claim 14, wherein there is a cap member mounted to the insulative housing to shield the first magnetic element.

16. A connector assembly comprising:
a housing defining a mating port forwardly communicating with an exterior along a front-to-back direction, and a mounting cavity around said mating port;
an optical module accommodated in the mounting cavity in a floatable manner along said front-to-back direction; and
a magnetic arrangement provided between the optical module and the housing and including a first part assembled to the housing and a second part assembled to the optical module to generate a constantly repelling force therebetween for quipping the optical module with a constant tendency of moving forwardly relative to the housing.

17. The connector assembly as claimed in claim 16, wherein both first part and second part are magnetic elements.

18. The connector assembly as claimed in claim 17, wherein the first part is located behind the second part and share a same polarity with the second part around an interface to generate said constantly repelling force therebetween for urging the optical module to move forwardly relative to the housing.

19. The connector assembly as claimed in claim 16, wherein a plurality of fibers are located behind and coupled to the optical module.

20. The connector assembly as claimed in claim 1, wherein said interacting forces provides a constantly repelling force to urge the optical module to move relative to the insulative housing forwardly.

* * * * *